(12) United States Patent
Tarabbia et al.

(10) Patent No.: US 11,434,718 B2
(45) Date of Patent: Sep. 6, 2022

(54) METHOD FOR CORING THAT ALLOWS THE PRESERVATION OF IN-SITU SOLUBLE SALT CEMENTS WITHIN SUBTERRANEAN ROCKS

(71) Applicant: SAUDI ARABIAN OIL COMPANY, Dhahran (SA)

(72) Inventors: Paul Joseph Tarabbia, Dhahran (SA); Abdulmohsin Mansor, Aziziah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 48 days.

(21) Appl. No.: 16/913,610

(22) Filed: Jun. 26, 2020

(65) Prior Publication Data

US 2021/0404288 A1    Dec. 30, 2021

(51) Int. Cl.
| | |
|---|---|
| *E21B 33/138* | (2006.01) |
| *C09K 8/42* | (2006.01) |
| *E21B 21/08* | (2006.01) |
| *E21B 25/08* | (2006.01) |
| *C04B 24/32* | (2006.01) |
| *C04B 26/06* | (2006.01) |
| *C09K 8/02* | (2006.01) |
| *C09K 8/34* | (2006.01) |
| *C09K 8/44* | (2006.01) |

(Continued)

(52) U.S. Cl.
CPC ............ *E21B 33/138* (2013.01); *C04B 24/32* (2013.01); *C04B 26/06* (2013.01); *C09K 8/02* (2013.01); *C09K 8/34* (2013.01); *C09K 8/42* (2013.01); *C09K 8/44* (2013.01); *E21B 21/08* (2013.01); *E21B 25/08* (2013.01); *E21B 49/00* (2013.01); *C04B 2103/0062* (2013.01); *C04B 2103/22* (2013.01)

(58) Field of Classification Search
CPC ...... E21B 33/138; E21B 21/08; E21B 21/082; E21B 21/085; E21B 25/08; C09K 8/02; C09K 8/42
See application file for complete search history.

(56) References Cited

U.S. PATENT DOCUMENTS

| | | |
|---|---|---|
| 2,666,620 A | 1/1954 | Welge et al. |
| 4,071,099 A | 1/1978 | Hensel, Jr. |

(Continued)

FOREIGN PATENT DOCUMENTS

| | | |
|---|---|---|
| GB | 1447442 A | 8/1976 |
| WO | 2014012781 A2 | 1/2014 |

(Continued)

OTHER PUBLICATIONS

International Search Report and Written Opinion issued in Application No. PCT/US2020/049882, dated Apr. 13, 2021 (19 pages).

*Primary Examiner* — Catherine Loikith

(74) *Attorney, Agent, or Firm* — Osha Bergman Watanabe & Burton LLP

(57) ABSTRACT

A method includes pumping an agent in a well across a target formation zone with rocks containing soluble salt cement. The agent is injected into pore space within the target formation zone extending a radial distance from the well using pressure, and the agent is allowed to cure in the pore space. The method further includes taking a core of the target formation zone containing the cured agent.

13 Claims, 6 Drawing Sheets

(51) Int. Cl.
   *E21B 49/00*     (2006.01)
   *C04B 103/00*    (2006.01)
   *C04B 103/22*    (2006.01)

(56) References Cited

U.S. PATENT DOCUMENTS

| | | |
|---|---|---|
| 4,466,495 A | 8/1984 | Jageler |
| 4,683,949 A | 8/1987 | Sydansk et al. |
| 5,360,074 A | 11/1994 | Collee et al. |
| 5,482,123 A | 1/1996 | Collee |
| 5,947,644 A | 9/1999 | Gibbons et al. |
| 5,980,628 A | 11/1999 | Hjelmeland et al. |
| 6,695,076 B2 | 2/2004 | Masui et al. |
| 6,830,105 B2 * | 12/2004 | Thesing .................. C09K 8/685 166/280.1 |
| 6,912,898 B2 | 7/2005 | Jones et al. |
| 7,748,265 B2 | 7/2010 | Reid et al. |
| 7,934,569 B2 | 5/2011 | Garcia et al. |
| 8,726,983 B2 | 5/2014 | Khan |
| 9,701,886 B2 * | 7/2017 | Muthusamy .......... E21B 21/003 |
| 9,864,092 B2 * | 1/2018 | Torres-Verdin .......... C09K 8/40 |
| 10,174,613 B2 | 1/2019 | Quintero et al. |
| 2002/0129937 A1 | 9/2002 | Cravatte |
| 2019/0211638 A1 | 7/2019 | Michael |
| 2020/0071595 A1 | 3/2020 | Al-Yami et al. |

FOREIGN PATENT DOCUMENTS

| | | |
|---|---|---|
| WO | 2018149866 A1 | 8/2018 |
| WO | 2020046732 A1 | 3/2020 |

\* cited by examiner

METHOD FOR CORING THAT ALLOWS THE PRESERVATION OF IN-SITU SOLUBLE SALT CEMENTS WITHIN SUBTERRANEAN ROCKS

BACKGROUND

Coring typically refers to the retrieval of a cylindrical volume of material from a subsurface environment. Coring is used in several industries that rely on this cored material for the quantification of the subsurface rock properties found at various depths in the subsurface environment. For example, the mining, minerals and oil and gas industries rely on coring as a way to investigate the subsurface for their associated resources. Other industries such as research and government departments also use coring as a way to conduct investigation work of sediments, rocks and ice (e.g., the deep-sea coring program).

The objective of this type of coring is to allow the retrieval of undisturbed competent material to the surface for the purpose of analysis and study as a way to correctly characterize the subsurface by the material being investigated.

Abundant coring in the oil and gas industry takes place in sedimentary rocks. Sedimentary rocks are primarily composed of material that makes up the framework of the rock, which is a function of its depositional setting and burial history. The framework of the rock can be composed of different material that can be either deposited with the rock or modified/altered during its burial or exhumation.

Most sedimentary rocks below the earth's surface contain a water phase in porous media that due to its chemical composition will either precipitate, preserve or dissolve cements and/or framework material.

One component that is present in sedimentary rocks and is heavily influenced by subsurface fluids is often referred to as cements. These cements are typically introduced into the rock after the main framework components have been deposited and may act to cement the sediments together. Cements in sedimentary rocks vary in mineral composition and typically form on, in-between and within primary framework grains. Common types of cements include, for example, silica, calcium carbonate (calcite), and iron oxides.

A sub category of cements found in the subsurface are salt cements. Salt cements are a class of cements that can either be soluble or in-soluble in water and can be present in rocks in the subsurface to varying amounts. The water soluble salt cements at depth are often very sensitive to temperature changes, as well as changes in the water chemistry that are in contact with these salt cements. This makes soluble salt cements difficult to quantify as the process of coring changes the thermal contrast of the cored rock and typically introduces water as a product of the coring process. Both the thermal changes and the introduction of water will have the potential to alter and dissolve soluble salt cements which will result in the incorrect quantification of this cement type that is present in the subsurface and misrepresent the actual pore space by the loss of the soluble salt cement.

SUMMARY OF INVENTION

In one aspect, embodiments of the present disclosure relate to methods of coring that include pumping an agent into a well to a target formation zone comprising rock containing soluble salt cements, using pumping pressure to inject the agent into free pore space within the target formation zone extending a distance from the well, allowing the agent to cure in the pore space, and taking cores of the target formation zone containing the cured agent.

In another aspect, embodiments of the present disclosure relate to methods for overbalanced drilling that include casing a well extending to a boundary of a target formation zone, including providing a casing shoe separating the well from the target formation zone, drilling through the casing shoe to drill a wellbore through the target formation zone, wherein during drilling, drilling fluids composed of oil that contain strong surfactants and non-native bridging material is pumped through the wellbore to provide a wellbore pressure that is no greater than 200 psi over a formation fluid pressure within the target formation zone, pumping an agent(s) into the wellbore at a pressure greater than the formation fluid pressure to inject the agent(s) a distance into the target formation zone from the wellbore, and allowing the agent to cure within the target formation zone.

In yet another aspect, embodiments of the present disclosure relate to the variety of rigid polymers, resin polymers and other agents that can be used to either bind with any subsurface water or cement all available pore space, or both. The agent may be pumped into a borehole at a pumping pressure to inject the agent a distance into the formation from the borehole.

Other aspects and advantages of the invention will be apparent from the following description and the appended claims.

DETAILED DESCRIPTION

Embodiments disclosed herein relate generally to methodologies that can be used to preserve sensitive in-situ soluble salt cements found in subsurface rocks (e.g., sedimentary formations or igneous formations) that will allow their proper volumetric quantification and spatial distribution once the rock is brought to the surface. For example, polymers/synthetic particles/resin cements ("agent(s)") may be used to preserve in-situ soluble salt cements in a core that are a native component of the rock.

By using an agent to penetrate into the pore space of a rock and preserve the in-situ salt cements, a more accurate representation of the formation properties may be determined from core samples taken of the formation. In contrast, when using traditional coring methods, soluble salt cements may be lost (e.g., dissolved) due to either thermal changes or the introduction of water or other chemicals used in traditional coring methods. The loss of these soluble salt cements may artificially increase the core measured porosity and permeability of the samples taken from traditional coring methods, which would not reflect downhole conditions and impact decisions on production and affect hydrocarbon reserves.

Methodologies to preserve in-situ soluble salt cements in cores (rock samples) taken from a subsurface target formation zone may include one or more steps to access the subsurface target formation (e.g., drilling to the top of the target formation zone, casing portions of a drilled wellbore, running in drill pipe to drill the target formation, and logging), pumping an agent a distance into the target formation zone from the wellbore, and retrieving one or more core samples from the target formation zone. The core samples may then be analyzed for salt cement and mineral identification.

Accessing the Target Formation Zone

When drilling a well into the target formation zone, one or more parameters of the drilling processes may affect the composition of the formation proximate the well (e.g., including dissolution of salt cements within the formation), which may distort analyses of the formation used in planning further drilling operations and production. Thus, according to embodiments of the present disclosure, one or more precautionary steps may be taken to reduce or prevent disturbing the composition of a target formation zone prior to coring. In some embodiments, such steps may include drilling to and into the target formation zone in stages, where a top-hole drilling stage for drilling an upper portion of the well may be different than a subsequent drilling stage for drilling a main investigation borehole of the well extending into the target formation zone.

Figure 1:
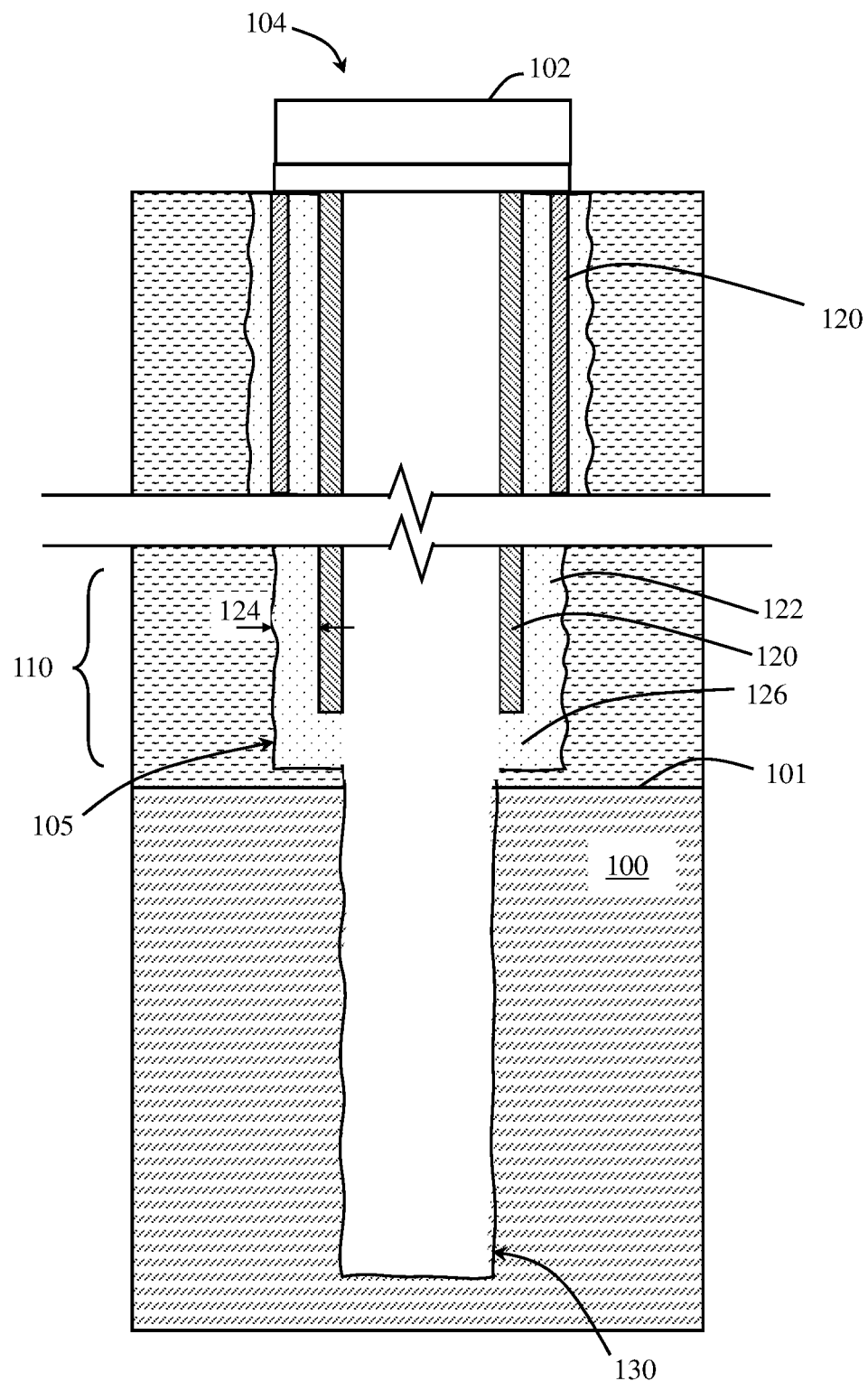
FIG. 1 shows a diagram of a well system according to embodiments of the present disclosure.

For example, FIG. 1 shows an example of a method for accessing a target formation zone 100 using multiple stages of drilling. The target formation zone 100 may be a formation (e.g., a layer of sedimentary rock) containing soluble salt cements formed therein. In a top-hole drilling stage, one or more boreholes may be drilled in either overbalanced or underbalanced conditions to a section 110 above the target formation zone 100. As used herein, "above" the target formation zone 100 may refer to a location proximate to a boundary 101 of the target formation zone 100 that is closer to the surface 102 of the well 104 than the target formation zone 100. Further, as used herein, the term "borehole" may refer to an uncased, open hole portion of a well.

While an upper portion of the well 104 (extending from section 110 to the well surface 102) is shown in FIG. 1 as including multiple concentric casings 120, such configuration is not meant to limit the scope of embodiments disclosed herein, and is merely shown as a representation of a well extending to a wellhead. Boreholes drilled through an upper portion of the well 104 may be cased as is known in the art, including hanging one or more casings 120 extending different depths from the wellhead, or may be left as an open hole.

After the drilled borehole 105 reaches the section 110 above the target formation zone 100, casing 120 may be lowered within the borehole 105 extending through section 110. The borehole 105 within section 110 may be drilled to be in close proximity to the target formation zone 100, and the casing 120 may be set in cap rock or a sealing formation, above the target formation zone 100.

Casing 120 may be set, for example, by positioning a string of casing pipe within the borehole 105 and pumping cement 122 through the interior of the casing 120, to the bottom of the casing, and around the exterior of the casing 120 within the annulus 124 formed between the casing 120 and borehole 105 within section 110. When the cement is placed, the casing 120 may include a casing shoe 126 formed at the bottom of the casing 120, such that the casing shoe 126 may at least in part separate an upper section of the well (formed by the cased borehole across section 110) from the target formation zone 100.

After the cement 122 hardens and the casing 120 is bonded to the borehole across section 110, the casing shoe 126 may be drilled through to drill the main investigation borehole 130 through a portion of the target formation zone 100 in a subsequent drilling stage. For example, the casing shoe 126 may be drilled out with a drilling assembly having at least an 8.5 in outer diameter. The investigation borehole 130 may be drilled to a target depth (e.g., 30 to 60 feet) into the target formation zone 100 far enough to provide a rat hole for logging tools to capture data across the zones of interest and take logs of the target formation zone 100.

According to embodiments of the present disclosure, different drilling fluid parameters may be used to drill different stages of a well extending a depth into a target formation zone. For example, referring to the example shown in FIG. 1, the upper portion of the well that extends to section 110 and the investigation borehole 130 may be drilled using different drilling fluid parameters selected from at least one of the drilling fluid pumping rate (how fast the drilling fluid is pumped through the drill string into the well), drilling fluid composition, and wellbore pressure (based in part on the weight of the drilling fluid).

In some embodiments, a portion of a well drilled through the target formation zone (e.g., investigation borehole 130 in FIG. 1) may be drilled in underbalanced conditions, where the wellbore pressure exerted on a formation exposed in a wellbore is less than the internal formation fluid pressure of the formation. The wellbore pressure (sometimes referred to as the hydrostatic pressure) refers to the force per unit area caused by the column of drilling fluid in the wellbore. The formation fluid pressure (sometimes referred to as formation pressure, pore pressure, or reservoir pressure) refers to the pressure of the fluids within the subsurface formation. When drilling in the target formation zone in underbalanced conditions, the drilling fluid may be diesel (or petroleum substitute) that does not contain salt and/or with only the addition of surfactants to the base fluid. Diesel (or petroleum substitute) may be selected due to it being non-reactive with water-soluble salt cements. Surfactants may be added to diesel or the petroleum substitute drilling fluid to provide strong oil wetting conditions if any filtrate was to invade the target formation zone due to counter-current imbibition processes. In some embodiments, a drilling fluid may be selected that when pumped through the well, the wellbore pressure is less than a formation fluid pressure within the target formation zone, thereby providing underbalanced drilling conditions. Advantageously, underbalanced conditions may induce the lowest temperature shock (relative to overbalanced conditions) to the target formation zone which contains the soluble salt cements.

According to embodiments of the present disclosure, a drilling fluid may be designed or selected to have a composition that does not co-precipitate with any salt cements identified in the target formation zone. Selecting a drilling fluid that does not co-precipitate with salt cements in a target formation zone may include testing in a lab with core material from the target formation zone to confirm that they do not precipitate or dissolve the salt species under investigation in combination with the drilling fluid (in either underbalance or overbalance conditions). Based on the identified salt cements within the target formation zone, the drilling fluid composition may be selected or altered so as to not react with the identified salts.

Additionally, surfactants in a drilling fluid formulation may be selected to enhance the capacity to change the wettability of the target formation zone to strongly oil-wet and hence making it oleophilic. In some embodiments, a drilling fluid may be composed entirely of an oil based mud without a water phase which would have the capacity to preserve the salt cement. In some embodiments, a drilling fluid may be an oil based mud having a water phase and at least one emulsifier that does not precipitate with the identified salt cement. The reactivity between the drilling fluid and the identified salt cement may be tested under at least one temperature and pressure condition replicating downhole conditions (e.g., temperature and pressure gradients simulating downhole conditions in the target formation zone).

Methods disclosed herein for preserving salt cements within a target formation zone may have improved results when a drilling fluid without a water phase is used to drill the target formation zone. Thus, in some embodiments, a drilling fluid may be designed or selected to avoid any water in its composition. For example, a drilling fluid may be designed or selected to be an oil based mud free of a water phase. However, in some embodiments, where a water phase is used in the drilling fluid for operational reasons, the drilling fluid composition may be designed to minimize the amount of water used, as any water in the drilling fluid has the capacity to invade the target formation zone and become either a mechanism to dissolve the salt species under investigation, or to become trapped in the rock prior to the coring phase (as either in free form or as a precipitated phase). For example, in underbalanced conditions using drilling fluids containing water may result in counter current imbibition, which could introduce water not native to the rock and may cause precipitation of salts that are in addition to the salts under investigation.

According to embodiments of the present disclosure, drilling fluid containing a water phase may be designed or selected so as to not dissolve the salt species native to the target formation zone. Table 1, below, shows a list of example salts and their solubility in water.

TABLE 1

Solubility of Salts.

| Salts | Soluble | Insoluble |
|---|---|---|
| Sodium, Potassium, Ammonium, Nitrates, Ethanoates | All | None |
| Chlorides, Bromides, Iodides | Most soluble | Silver, Lead(II) |
| Sulfates | Most soluble | Barium, Lead(II), Calcium |
| Carbonates | Sodium, Potassium, Ammonium | Most insoluble |

In some embodiments, drilling fluid containing a salt component may be designed by selecting the salt component to have a different CT number than that of any target salt cements in the target formation zone. With such design, salt component(s) from drilling fluids that may have contaminated the target formation may be distinguished from the salt cements native to that formation. For example, in some embodiments where a weighting agent or chemical additive is added to the drilling fluid used for drilling and/or coring a target formation zone having sodium (Na) bearing target salts, the additive(s) in the drilling fluid may be selected to not contain sodium. Similarly, when drilling/coring in a formation having carbonates that are composed of calcium (Ca), drilling fluid additive(s) may be selected to not contain calcium. For example, additive(s) in drilling fluid may be selected from strontium (Sr) or barium (Ba) based elements, which have different CT numbers than sodium and calcium.

In some environments or locations, when drilling a target formation zone in underbalanced conditions may not be possible or practical, the target formation zone may be drilled in overbalanced conditions (where the wellbore pressure in the wellbore exceeds the internal formation fluid pressure of the formation). For example, overbalanced drilling may be used when drilling wells offshore.

When drilling in overbalanced conditions, one or more drilling fluid parameters may be designed to mitigate effects of overbalanced drilling on core sample preservation (e.g., potential drilling fluid encroachment into the target formation zone and changes in temperature in the target formation zone near the wellbore). For example, drilling fluid parameters may be designed to reduce and/or make as low as possible the mud weight. In some embodiments, drilling fluid is pumped through the wellbore to provide a wellbore pressure that is no greater than 200 psi over a formation fluid pressure within the target formation zone.

Drilling fluid parameters designed for overbalanced drilling may also include using low volume pumping of the drilling fluid, which may, for example, reduce thermal effects on the formation. For example, in some embodiments, drilling fluid may be pumped at a rate less than 100 gpm (e.g., 70 to 90 gpm) such that the drilling fluid may still be able to clean debris from the bit while also trying to limit high circulation volumes. Low volume pumping of drilling fluid may thus be used to refer to the amount of drilling fluid sent downhole to clean and cool the bit at the lowest possible rate. For example, in some embodiments, low volume pumping may include a pumping rate of drilling fluid of less than 100 gpm that may limit thermal cooling of the target formation.

Further, drill bits typically have drilling fluid ports around the cutters on the bit to deliver the drilling fluid to the drilling interface with the rock, which may help with, for example, debris clearing, cooling the cutters, and drilling into the rock. According to embodiments of the present disclosure, a drill bit used to drill the wellbore into the target formation zone may be designed or selected to include relatively larger drilling fluid ports to reduce jetting at the bit face and potentially minimize the temperature effects of the cooler drilling fluids.

In some embodiments, drilling fluid parameters designed for overbalanced drilling may include using an oil based drilling fluid with no water component.

In some embodiments, when drilling in overbalanced conditions, surfactants or wetting agents may be added to the drilling fluid, where the surfactants/wetting agents may be selected as ones that strongly modify the target formation rock to oil wet conditions but do not interact with the salt cements under investigation (lab testing may be done to confirm retention of salt species with the introduction of the surfactants). For example, a drilling fluid may be designed to have at least one surfactant added for drilling fluid stability (e.g., for keeping the drilling fluid stable in a downhole temperature range) and at least one additionally surfactant to alter the near borehole rock to oil wet conditions.

In some embodiments, when drilling in overbalanced conditions, bridging material (solids that bridge across the pore throat or fractures of an exposed rock thereby building a filter cake to prevent loss of whole mud or excessive filtrate) that is non-native to the target formation zone may be added to the drilling fluid. Because the bridging material may be the only component of the drilling fluid acting as a filtrate (infiltrating into the target formation zone), selecting a material that is non-native to the target formation zone may make it easier to identify effects from the drilling fluid when analyzing samples of the target formation zone. Thus, when expected loss of drilling fluid into the target formation zone occurs during overbalanced drilling, the drilling fluid infiltration may be accounted for based on the amount of non-native bridging material identified when analyzing samples of the target formation zone. In such embodiments, the bridging material may be selected to allow substantial filtrate loss into the formation which will enable any pumping of agents the ability to be move into the target formation. Oversize bridging material may be used so that it reduces the static losses of mud but still retains the ability to move subsequent volumes of an agent(s) into the formation.

Setting casing in a section of the well above the target formation zone may also help when drilling in overbalanced conditions, as the casing may help reduce the pressure gradient from the well. For example, when drilling in overbalanced conditions, a portion of a well extending from the wellhead to a boundary of the target formation zone may be drilled and cased. After the casing has been cemented in place and hardened, a next section of the well may be drilled to a depth into the target formation zone from the cased section of the well with a narrowed pressure differential.

As mentioned above, when drilling a depth into a target formation zone, logging operations may be performed to gather data about the formation(s) around the wellbore. If a well was drilled in underbalanced conditions, then the well may be shut in during logging in order to stop the flow of fluids from the wellbore to the surface of the well during logging. If a well was drilled in overbalanced conditions, then static losses of the drilling fluid may be monitored during logging.

Logging operations may be performed in the borehole that was drilled across the target formation zone using, for example, a Litho Scanner™ or other similar commercially available logging tool to obtain sigma and/or elemental spectroscopy of the formation.

The sigma of any given formation is the macroscopic cross-section for the absorption of thermal neutrons, or capture cross-section, of a volume of matter, measured in the capture units (c.u.), and is a sum of all the measured units from the cross-section. Sigma may be captured using an open-hole or cased-hole pulsed neutron capture log. If the formation contains different percentages of rock forming minerals (and the fluids within the rock do not change), then a change in sigma may be directly related to the change in the mix of components (porosity may also be related). However, it has been observed in some wells through formations containing sodium salts, that sigma varies in what appears to be a fairly homogeneous rock. Hence, if the percentage of salt cements vary in the formation rock through a tested section of the borehole, sigma may be run to high grade the location of the plugs to be taken.

Logging tools may also be able to differentiate salt cements (e.g., Na-based salts) in a rock formation from other elements using elemental spectroscopy. When logging tools having a neutron generator are run downhole, the operator may extract from the collected spectroscopy data a general breakdown of the major rock forming elements, and thus may be used to identify qualitatively compositional trends in the formation. In such manner, spectroscopy logging tools may be used to identify high grade zones where coring samples may be taken. For example, sodium is generally not a major rock forming mineral, and as such, its detection may indicate one of a handful of common rock types having sodium, such as in carbonate rock where sodium may be present in the salt cements of the carbonate rock.

The analysis of the target formation zone with the logging tool may be used to identify areas of high concentrations of the salt species under investigation. One or more logging operations may be done before coring the target formation zone to identify areas within the target formation of high grade location depths for the coring tool (e.g., rotary sidewall coring tool). Optionally, other logs such as nuclear magnetic resonance (NMR) logging may be run to verify the pore space that is occupied by the fluids. However, in embodiments where surfactants added in the drilling fluid have changed the near wellbore wettability of the formation, there may be no capillary bound water to measure from NMR logging.

Once logging has been performed and the tools are out of the borehole, a drilling assembly may be lowered into the well to above the target formation. Where the portion of the well above the target formation zone has been cased, the drilling assembly may be positioned above a casing shoe and inside the cased portion of the well to allow the spotting (delivery) of the agent(s).

Agent Injection

An agent may be a composition including a rigid polymer, epoxy polymer or any other formulation that either binds any subsurface water or fully cements the available pore space in the rock, or both. Further, an agent has low enough viscosity that it may penetrate into the pore space in the target formation to bind with subsurface water in the pore space or harden within the available pore space. For example, the agent may be designed to have a viscosity that is close to the viscosity of water at a given temperature (e.g., a viscosity less than 2 times the viscosity of water). In some embodiments, an agent may be designed to have a viscosity that is similar to (e.g., within 10 percent) the viscosity of any native fluid within a target formation zone. The agent may be designed to have a low enough viscosity that it can penetrate a distance radially into the target formation zone from the wellbore, for example, 2 to 4 feet radially from the wellbore.

By penetrating/impregnating an agent a distance radially into the target formation zone, an agent that is designed to bind with subsurface water may then cure or harden which locks any free water into the structure of the agent (e.g., drilling fluid or migrating formation fluid). This type of agent, once cured, may not fully cement the subsurface pore-space and filtrate losses may still be present if the well was drilled in underbalanced conditions.

Figure 2A:
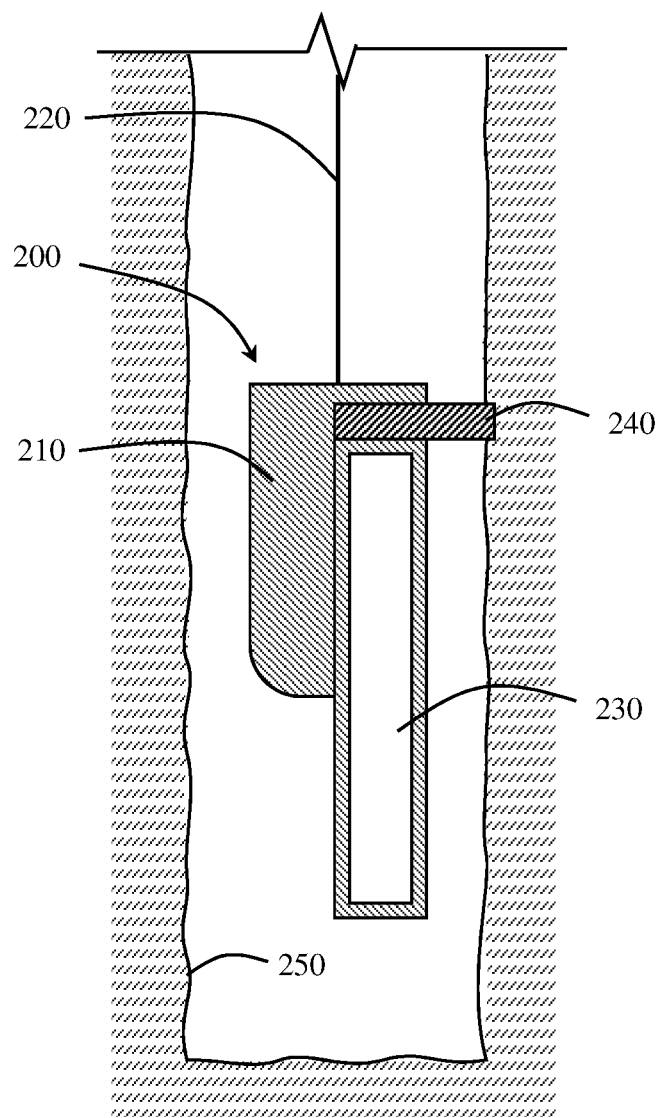
FIGS. 2A and 2B show examples of coring systems according to embodiments of the present disclosure.
Figure 2B:
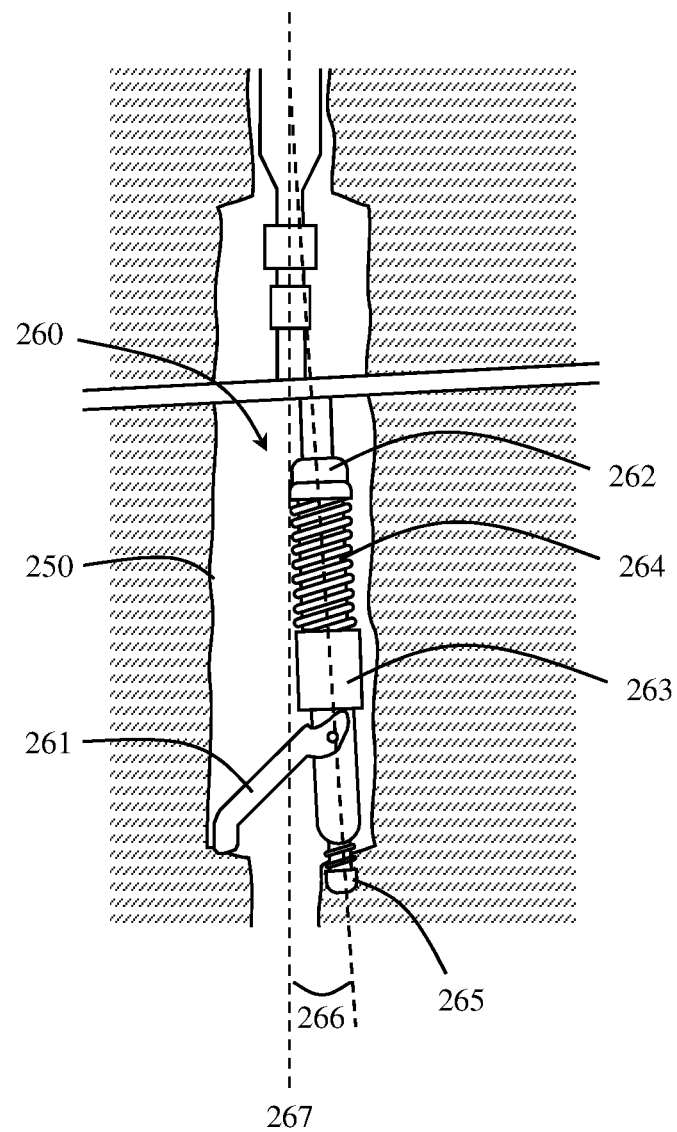

By penetrating/impregnating an agent a distance radially into the target formation zone, an agent that is designed to form a cement may effectively seal and preserve the penetrated radius of the target formation zone from any other fluids not native to the target formation zone. In other words, by filling all the available pore space within the penetrated radius of the target formation zone with an agent, non-native fluids such as drilling fluid or other formation fluid are not able to move into the penetrated target formation zone and alter is composition (e.g., non-native fluids would not be able to precipitate cements in the rock). After the agent has penetrated a radial distance into the target formation zone and cured or hardened, it may be necessary to drill out the wellbore prior to running any sidewall coring tool, such as shown in FIG. 2A, or condition the hole before running other coring options, such as shown in FIG. 2B. Any indication of mud losses after a cementing agent has cured may indicate incomplete distribution of the agent in the target formation and a subsequent re-treatment of this zone with the agent(s) may be performed. Coring may then proceed across the zone of the cemented target formation zone and once brought to surface can be taken for analysis, where the composition of the sample plugs may be identified with a greater confidence of being native to the target formation zone rather than altered from non-native fluids introduced during the drilling and coring processes.

The composition of the agent(s) may vary depending on the characteristics of the target formation zone to be cored. For example, target formation zones having relatively lower permeability may use agents having lower viscosity and/or may have the agent pumped into the target formation zone at higher pressures compared with a target formation zone having relatively higher permeability, which may utilize agents having relatively higher viscosity and/or lower pressure. Further, an agent may be designed to have a selected range of viscosity under a selected temperature range, for example under expected downhole temperatures in the target formation zone. For example, binding agents of the present disclosure may be designed to have a viscosity ranging from about 0.2 cP (0.2 mPa·s) to about 5 cP (5 mPa·s) (e.g., about 2 cP) in downhole temperatures ranging from about 100° F. (38° C.) to about 250° F. (121° C.).

According to embodiments of the present disclosure, an agent may be an epoxy resin system that includes at least one epoxy resin and at least one curing agent. In some embodiments, the average molecular weight of the epoxy resin is from about 300 g/mol to about 2000 g/mol. The epoxy resin may include bisphenol-A-based epoxy resins, bisphenol-F-based epoxy resins, aliphatic epoxy resins, or combinations of these epoxy resins. For example, aliphatic epoxy resins may have formula (I):

$$(OC_2H_3)-CH_2-O-R^1-O-CH_2-(C_2H_3O) \quad (I)$$

where $R^1$ may be a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. In some embodiments, $R^1$ may be an alkyl group. For example, in one embodiment, the epoxy resin may include 1,6-hexanediol diglycidyl ether, which has formula (II):

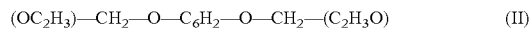

$$(OC_2H_3)-CH_2-O-C_6H_2-O-CH_2-(C_2H_3O) \quad (II)$$

In some embodiments, the epoxy resin may include at least one of 1,6-hexanediol diclycidyl ether, alkyl glycidyl ethers having from 12 to 14 carbon atoms, 2,3-epoxypropyl o-tolyl ether, bisphenol-A-epichlorohydrin epoxy resin, or combinations of these. In other embodiments, the epoxy resin may include at least one of 1,6-hexanediol diclycidyl ether, alkyl glycidyl ethers having from 12 to 14 carbon atoms, or 2,3-epoxypropyl o-tolyl ether.

The epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq).

In some embodiments, the epoxy resin system may be modified with a reactive diluent. The type and amount of reactive diluent may influence the viscosity, flexibility, hardness, chemical resistance, mechanical properties, plasticizing effect, reactivity, crosslinking density, or other properties of the epoxy resin system. In some embodiments, the reactive diluent may be added to the epoxy resin system to change the viscosity of the epoxy resin system, such as to reduce the viscosity of the epoxy resin system. In other embodiments, the reactive diluents may be added to improve at least one of the adhesion, the flexibility, and the solvent resistance of the epoxy resin system.

The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. Therefore, a functional reactive diluent may have one, two, three, or more than three epoxide functional groups. The term "non-functional," as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin system may include a reactive diluent having the formula (III):

$$R^2-O-CH_2-(C_2H_3O) \quad (III)$$

where $R^2$ is a hydrocarbyl having from 12 to 14 carbon atoms. $R^2$ may be linear, branched, or cyclic. In some embodiments, $R^2$ may be an alkyl group.

In some embodiments, the epoxy resin system may include an amount of reactive diluent that reduces the viscosity of the epoxy resin system. In other embodiments, the epoxy resin system may include an amount of reactive diluent that modifies one or more of the adhesion, the flexibility, or the solvent resistance of the epoxy resin system. In some embodiments, the epoxy resin system may include from 1 wt. % to 30 wt. % reactive diluent based on the total weight of the epoxy resin portion of the epoxy resin system.

As used in this disclosure, the term "epoxy resin portion" refers to the constituents of the epoxy resin system that do not include the curing agent, weighting agents, or other additives, such as accelerators or retarders. The epoxy resin portion includes the epoxy resins and any added reactive or non-reactive diluent. In other embodiments, the epoxy resin system may include from 1 wt. % to 20 wt. %, from 1 wt. % to 16 wt. %, from 1 wt. % to 14 wt. %, from 1 wt. % to 12 wt. %, from 5 wt. % to 30 wt. %, from 5 wt. % to 20 wt. %, from 5 wt. % to 16 wt. %, from 5 wt. % to 14 wt. %, from 5 wt. % to 12 wt. %, from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 14 wt. % to 30 wt. %, from 14 wt. % to 20 wt. %, or from 14 wt. % to 16 wt. % reactive diluent based on the total weight of the epoxy resin portion of the epoxy resin system.

In some embodiments, the epoxy resin system may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)- alkyloxy) methyl] derivatives to reduce the viscosity of the resin and improve the adhesion, flexibility, and solvent resistance of the final resin. The bisphenol-A-(epichlorohydrin) epoxy resin with the reactive diluent oxirane mono [($C_{12}$-$C_{14}$)-alkyloxy) methyl] derivatives may modify the viscosity of the agent. In some embodiments, the epoxy resin may include from 80 wt. % to 90 wt. %, from 80 wt. % to 88 wt. %, from 80 wt. % to 86 wt. %, from 80 wt. % to 84 wt. %, from 82 wt. % to 90 wt. %, from 82 wt. % to 88 wt. %, from 82 wt. % to 86 wt. %, from 82 wt. % to 84 wt. %, from 84 wt. % to 90 wt. %, from 84 wt. % to 88 wt. %, or from 84 wt. % to 86 wt. % bisphenyl-A-epichlorohydrin epoxy resin based on the total weight of the epoxy resin portion. In some embodiments, the epoxy resin may include from 10 wt. % to 20 wt. %, from 10 wt. % to 18 wt. %, from 10 wt. % to 16 wt. %, from 10 wt. % to 14 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, or from 14 wt. % to 16 wt. % oxirane mono[($C_{12}$-$C_{14}$)-alkyloxy) methyl] derivatives based on the total weight of the epoxy resin portion of the epoxy resin system.

In some embodiments, the epoxy resin system may include 2,3-epoxypropyl-o-tolyl ether, which may have an epoxy equivalent weight of from 170 g/eq to 190 g/eq and exhibit a dynamic viscosity of from 7 mPa·s to 10 mPa·s. In other embodiments, the epoxy resin system may include alkyl glycidyl ethers having from 12 to 14 carbon atoms, which may have an epoxy equivalent weight of from 270 g/eq to 305 g/eq and may exhibit a dynamic viscosity of from 5 mPa·s to 12 mPa·s. In some embodiments, the epoxy resin system may include 1,6-hexanediol diclycidyl ether, which may have an epoxy equivalent weight of from 150 g/eq to 170 g/eq and may exhibit a dynamic viscosity of from 20 mPa·s to 30 mPa·s.

In some embodiments, the epoxy resin system may include a plurality of epoxy resins. For example, in some embodiments, the epoxy resin system may include a combination of two or more of bisphenol-A-epichlorohydrin epoxy resin, 2,3-epoxypropyl-o-tolyl ether, $C_{12}$-$C_{14}$ alkyl glycidyl ether, or 1,6-hexanediol diglycidyl ether epoxy resin. In one embodiment, the epoxy resin system may include a mixture of 1,6-hexanediol diglycidyl ether epoxy resin and bisphenol-A-epichlorohydrin epoxy resin with the reactive diluent oxirane mono [($C_{12}$-$C_{14}$)-alkyloxy)methyl] derivatives.

In some embodiments, the epoxy resin system may include from 20 wt. % to 99 wt. % epoxy resin based on the total weight of the epoxy resin system before curing. In other embodiments, the epoxy resin system may include from 20 wt. % to 97 wt. %, from 20 wt. % to 95 wt. %, from 20 wt. % to 90 wt. %, from 20 wt. % to 80 wt. %, from 20 wt. % to 60 wt. %, from 40 wt. % to 99 wt. %, from 40 wt. % to 97 wt. %, from 40 wt. % to 95 wt. %, from 40 wt. % to 90 wt. %, from 40 wt. % to 80 wt. %, from 40 wt. % to 60 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 80 wt. % to 99 wt. %, from 80 wt. % to 97 wt. %, from 80 wt. % to 95 wt. %, from 80 wt. % to 90 wt. %, from 90 wt. % to 99 wt. %, from 90 wt. % to 97 wt. %, or from 90 wt. % to 95 wt. % epoxy resin based on the total weight of the epoxy resin system before curing.

The epoxy resin system may also include a curing agent to cure the epoxy resin. The curing agent may include at least one of an amine, polyamine, amine adduct, polyamine adduct, alkanolamine, amide, polyamide, polyamide adduct, polyamide imidazoline, polyaminoamides, phenalkamine, or combinations of these. Amines or polyamine curing agents may include, but are not limited to, aromatic amines, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), or combinations of these. In other embodiments, the curing agent may include at least one of DETA, TETA, TEPA, IPDA, or combinations of these. In some embodiments, the epoxy resin system may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1:

$$(V_{HCl} * N_{HCl} * MW_{KOH})/W \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2:

$$(1000 * MW_{KOH})/MW_{curing\ agent} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

In some embodiments, an agent may include an amount of the curing agent capable of curing the epoxy resin system to a semi-solid state within a cure time of from less than 12 hours. In some embodiments, the binding agent may include from 0.1 wt. % to 20 wt. % curing agent based on the total weight of the epoxy resin system before curing. In other embodiments, an agent may have from 0.1 wt. % to 15 wt. %, from 0.1 wt. % to 10 wt. %, from 0.1 wt. % to 5 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 20 wt. %, from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, or from 10 wt. % to 20 wt. % curing agent based on the total weight of the epoxy resin system before curing.

According to some embodiments, the epoxy resin system may include from 20 weight percent to 97 weight percent epoxy resin based on the total weight of the epoxy resin system, the epoxy resin comprising at least one of 2,3-epoxypropyl o-tolyl ether, alkyl glycidyl ethers having from 12 to 14 carbon atoms, or a compound having Formula (I):

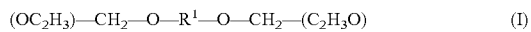

$$(OC_2H_3)-CH_2-O-R^1-O-CH_2-(C_2H_3O) \qquad (I)$$

where $R^1$ is a linear or branched hydrocarbyl having from 4 to 24 carbon atoms. The epoxy resin system may also include from 1 weight percent to 20 weight percent curing agent based on the total weight of the epoxy resin system.

According to other embodiments, the epoxy resin system may include from 20 weight percent to 97 weight percent epoxy resin based on the total weight of the epoxy resin system, the epoxy resin comprising bisphenol-A-epichlorohydrin epoxy resin and a reactive diluent having formula $R^2-O-CH_2-(C_2H_3O)$, where $R^2$ is hydrocarbyl having from 12 to 14 carbon atoms. The composition may also include from 1 weight percent to 20 weight percent curing agent based on the total weight of the composition.

The epoxy resin comprising at least one of alkyl glycidyl ethers having from 12 to 14 carbon atoms, 2,3-epoxypropyl o-tolyl ether, a bisphenol-A-epichlorohydrin epoxy resin, or a compound having Formula (I):

$$(OC_2H_3)-CH_2-O-R^1-O-CH_2-(C_2H_3O) \qquad (I)$$

where $R^1$ is a hydrocarbyl having from 4 to 24 carbon atoms, where the epoxy resin has an epoxy equivalent weight of from 170 to 350 epoxy equivalents per gram. The epoxy resin system may also include from 1 weight percent to 20 weight percent curing agent based on the total weight of the epoxy resin system. In some embodiments, the epoxy resin system may have a viscosity of less than 500 mPa·s.

Binding agents according to embodiments of the present disclosure may include rigid or resin polymer compositions. For example, resin polymer systems, such as discussed above, may be used to invade all the available pore space being displaced in a target formation zone by formulating the resin polymer system to have a viscosity close to the viscosity of water at a selected temperature. Once set, the resin polymer binding agent may form a fully cemented region of the target formation zone around the wellbore. A resin polymer agent may be formulated (e.g., reducing the binding agent viscosity) so that it may penetrate into the target formation zone a distance ranging from about 2 to 4 feet around the entire open hole.

In some embodiments, an agent may be a rigid polymer system that may bond with water and make the water part of the solidified agent once it hardens. In other words, agents may be designed to form a rigid compound in the presence of any water based fluid in the target formation zone and lock that fluid in the rock as a solid. If overbalanced drilling was used which had a water component in the drilling mud, then the agent may bind with the drilling fluid water component as well as any water originally in the target formation zone and form a solid. The amount of the agent that may be spotted across the target formation zone may be calculated as a function of being able to displace a region of the target formation zone of at least a 2 ft, 3.5 ft, or 4 ft radius from the borehole wall into the target formation zone across the entire open-hole interval. Further, the agent may be formulated to have low viscosity at downhole pressure and temperatures to allow for ease of emplacement even into the smallest pore space.

According to embodiments of the present disclosure, an agent being a rigid polymer system may include at least one type of polymer, for example, a derivative from the oxyalkylene polymer family (e.g., a polyglycol, a polyethylene glycol, or a chemically modified polyglycol) and/or a polyacrylamide, and at least one type of cross-linker, such as chromium acetate. Examples of suitable polymers for use in an agent may include, but are not limited to, Cr(III) acetate with hydrolyzed polyacrylamide (HPAM), Cr(III) propionate HPAM, Cr(III) lactate/carboxylate HPAM, Cr(III) malonate HPAM, Al-citrate/HPAM, Al-citrate/HPAM cationic polyacrylamides (CPAM), acrylamides, acrylates, polyethyleneimine with t-butylacrylate/acrylamide copolymers, aldehydes or hexamethylenetetramine (HMTA) with phenolic/hydroquininone cross-linkers with polyacrylamide (PAM) co- and terpolymers, cross-linked 2-acrylamido-2-methyl-1-propanesulfonic acid (AMPS), n-vinylpyrrolidone (NVP), acrylamide/acrylate co- and ter-polymers, amphoteric polymers and terpolymers, and hydrophobically modified poly-(dimethylamino)ethyl methacrylate (DMAEMA) and polyacrylamide gelling agents.

The polymers in an agent may be selected depending on, for example, the permeability of the formation. For example, polymers in binding agents for use in relatively low permeability target formation zones may be selected to have relatively lower molecular weights than polymers chosen to make binding agents for use in target formation zones having relatively higher permeability.

In addition to being fluid enough (low viscosity) to penetrate a distance radially into a target formation zone, agents also cure or harden after a period of time in order to preserve the penetrated radius of the target formation zone. Accordingly, binding agents may have one or more retarders, including high temperature retarders and/or low temperature retarders. A high temperature retarder may operate at temperatures from about 180° F. to about 450° F. A low temperature retarder may operate at temperatures from about 120° F. to about 180° F. In some embodiments, the low temperature retarder may include calcium lignosulfonate. In some embodiments, the high temperature retarder may include ethylene glycol. In other embodiments, the high temperature retarder may include a mixture of an inorganic salt.

Other retarders that can be used may include, but are not limited to, modified lignosulfonates, sulfamethylated lignins, inorganic salts, acrylic polymers, aromatic polymer derivatives, a mixture of a sodium salt of alicyclic acid and an aminated aromatic polymer, an aliphatic amide polymer, scleroglucan, copolymers of isobutene and maleic anhydride, amino-N-([alkylidene]phosphonic acid) derivatives, alkanolamine-hydroxy carboxy acid salts (for example, tartaric acid and ethanolamine), phosphonocarboxylic acids, dicyclopentadiene bis(methylamine) methylenephosphonate, lignosulfonate derivatives, carbohydrates grafted with vinyl polymers, carboxymethyl hydroxyethylcellulose, wellan gum, Borax, carrageenan, polyethylene amine derivatives and amides, copolymers from maleic acid and 2-acrylamido-2 methylpropane sulfonic acid, ethylenediamine-tetramethylene phosphonic acid, polyoxyethylene phosphonic acid, citric acid, polyacrylic acid phosphinate, or combinations of these. In some embodiments, the agent may include less than or equal to 10 percent by weight retarder, such as less than or equal to 5 percent by weight, or even less than or equal to 3 percent by weight retarder. In some embodiments, an agent may include from 0.0 percent by weight to 10 percent by weight retarder. In some embodiments, the agent may include from 0.1 percent by weight to 10 percent by weight, from 1 percent by weight to 10 percent by weight, from 3 percent by weight to 10 percent by weight, or from 5 percent by weight to 10 percent by weight retarder.

In some embodiments, an agent formed of an epoxy resin system may include one or more additives to modify the speed of the reaction between the epoxy resin and the curing agent or modify other properties of the resin system, such as viscosity or yield point or other rheological properties. For example, in some embodiments, an epoxy resin system may include an accelerator or a retarder to speed up or slow down the reaction between the epoxy resin and the curing agent. Accelerators may include, but are not limited to, alcohols, phenols, aminoalcohols, or amines. Examples of accelerators may include, but are not limited to, benzyl alcohol, mono-nonylphenol, triethanolamine (TEA), amino-n-propyl diethanolamine, n,n-dimethyldipropylenetramine, or combinations of these. Examples of retarders may include lignin, gums, starches, lignosulphonate derivatives, or combinations of these.

In some embodiments, an agent may also include a friction reducer. In some embodiments, the friction reducer may be a sulfonic acid salt or an aromatic polymer derivative. Other friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. In some embodiments, the agent may include less than or equal to 10 percent by weight friction reducer, such as less than or equal to 5 percent by weight, or less than or equal to 1 percent by weight, or even less than or equal to 0.5 percent by weight friction reducer. In some embodiments, the binding agent may include a friction reducer ranging from a lower limit selected from 0.0 percent by weight, 0.001 percent by weight, and 0.5 percent by weight to an upper limit selected from 1 percent by weight, 5 percent by weight, and 10 percent by weight.

In some embodiments, an agent may include from 0.1 percent by weight to 10 percent by weight surfactant based on the total weight of the agent. In some embodiments, the agent may include a defoamer. A defoamer or "anti-foam additive," may be added to the agent to prevent frothing, foaming, and vapor entrapment that may occur during forming and injecting the agent.

When formulating an agent, including either rigid or resin polymer compositions, the salinity of any salt saturated water in the target formation zone (which may be determined, for example, from data collected from one or more logging operations) may be used to select components of the binding agent that do not alter the native salinity. Further, the salinity of any salt saturated water in the target formation zone may be considered for selecting components of the agent that may bind to the formation water and become a solid.

Further, when formulating an agent, extensive testing may be carried out in the lab to optimize the performance of the agent(s) with the formation fluids and operations. Testing will include but not limited to, interaction of the agent with the salt species under investigation, ensuring the hardened polymer allows for the breakage of the plugs if running sidewall cores, understanding the curing times required at a given temperature and pressure, possible interactions of running more than one agents in the same hole, and the effect of any additives such as hardeners or foaming agents with the salt species under investigation.

In some embodiments, an agent may include a water-based delivery system (e.g., to deliver a retarder or a polymer). With such agents, if the agent has a propensity to partition, the water-based delivery component may be designed to ensure that there is no precipitation of the salt species in the target formation zone from the agent.

According to embodiments of the present disclosure, a binding agent may be designed by reducing the viscosity of starting material selected from a commercially available water binding material and/or chemical shutoff gel. Chemical shutoff gels have been used to form barriers in a rock matrix in conventional drilling operations and often include at least one polymer, at least one cross linker capable of curing the at least one polymer, and a retarder capable of delaying cross linking of the at least one polymer. Unlike the agents used in coring operations according to embodiments of the present disclosure, which penetrate through a region of the target formation zone, water binding material and chemical shutoff gels are traditionally designed to surround a surface or near surface of a rock. Methods of designing an agent according to embodiments of the present disclosure may include adding at least one additive to a starting material composition to reduce the viscosity of the starting material. One or more additives, such as a reactive dilutant discussed above, may be added to a starting material composition to make an agent having a viscosity within 10 times of a viscosity of water at a selected temperature and/or a viscosity close to the viscosity of any fluids native to the target formation zone (e.g., a viscosity that is within a 10 percent variance from the viscosity of the native formation fluids at a given temperature).

Examples of commercially available starting materials that may be used as a starting composition to be modified to have a reduced viscosity include, from Marathon Oil Corporation, MaraSEAL or MARCIT, or from Schlumberger, OrganoSEAL R, FoamSEAL, OrganoSEAL F, ZONELOCK, ZONETROL XT, or WaterSEEKER Gel, or other gel systems, such as delayed gelation systems.

An agent having a reduced viscosity may be pumped downhole at a pumping pressure sufficient to inject the agent a radial distance into the target formation zone from the borehole.

Once an agent has been pumped and displaced into a target formation zone, the well may be shut in to allow enough time for the agent to cure. Once the agent has cured, the well may remain shut-in to monitor for any static losses in overbalanced conditions and maintain a minimum pressure above pore pressure from this point on until after coring has been completed. The amount of time for the agent to cure may vary depending on, for example, the depth of the well, the formulation of the agent that is mixed for the temperature expected, and the composition of the target formation zone. Additionally, by shutting in the well to wait for the agent to cure and maintaining a pressure downhole, the pressure may help prevent any formation water from migrating toward the well before the agent has cured or hardened.

In some embodiments, a second agent may be pumped downhole to the target formation zone after the first agent has cured, which may be used to occlude pore space and ensure that salt saturated water does not migrate back into the treated section of the target formation zone. For example, if a rigid polymer was run to bind with all the water and then followed by a resin polymer to occlude all the remaining pore space.

Coring

After an agent has been injected into the target formation zone and before coring, a clean-out of the open hole across the target formation zone of interest may be performed. For example, after pumping in the agent(s), the end of a drill string may be located close to the open hole section where the agent was pumped and within casing, and a clean-out of the well may clear any remnants of the agent from the wellbore to allow for the deployment of the coring tool.

Coring may be performed after an agent has been injected into the target formation zone and given a time to fully harden or cure. In some embodiments, the well may be shut-in to allow the agent to fully harden. While the well remains shut-in, and after the agent has hardened, and the well is either cleaned out or re-drilled, a coring program may be executed. The coring program may be designed to focus on areas of the target formation which the logs have either highlighted zones of interest or outlined the various location of target salt cements.

Coring tools may include a coring tool body that may be connected to a drill string or conveyed on wireline. A coring tool may further include one or more bits that may be extended from the coring tool to cut into the sidewall of the borehole and take plugs of the rock or drill a core at a low angle to the well using a kick-off sub. For example, a sidewall coring tool may include bow springs and knuckles (or other mechanical components) that may orient the cutting tools at an angle (e.g., 60 degrees to 70 degrees) to any breakout zones that may be identified along the borehole in the target formation zone. Bit(s) on a coring tool may be rotated at a low to moderate rotational speed to take a core of the rock, which may help keep coring temperatures low.

One or more pressure vessels (e.g., pressure vessels made of fiberglass) may be provided along the coring tool body, where the pressure vessel(s) may be prefilled with a low viscosity non-wetting gel. When core plug samples are taken with the coring tool, the plugs may be loaded into the pressure vessel(s) and brought to the surface of the well. In some embodiments, a coring tool may utilize one or more pressure core barrels or other type of pressurized container to store the cored sample in as they are transported from the target formation zone to the surface of the well. The coring tool containing the plugs may be brought to the surface of the well at the pressure obtained downhole in the pressure vessel(s). At the surface of the well, the pressure vessel may be separated from the main tool body and transported to a laboratory for analysis. Using a CT scan-able pressurized container to store and transport the plugs may help ensure the chemical integrity of the core sample for analysis.

FIG. 2A shows an example of a coring tool 200 according to embodiments of the present disclosure. The coring tool 200 may include a generally tubular body 210 that may be deployed on wireline 220 (or connected at the end of a drill string). A pressure vessel 230 may be provided in the tool body 210. In some embodiments, the pressure vessel 230 may be prefilled with a fluid or gel (e.g., an encapsulating material) prior to sending the coring tool 200 downhole. The coring tool 200 may further include a bit 240 that may extend outwardly from the tool body 210 to contact and cut a plug from within the borehole wall 250. Once the bit 240 has cored a plug from the borehole wall 250, the bit 240 and plug may be retracted back to the tool body 210 to deposit the plug within the pressure vessel 230.

In some embodiments, the main borehole may not require re-drilling after deploying the agent into the target formation zone, and the use of a coring assembly such as shown in FIG. 2B may be deployed, which may core at a deviation from the axial direction of the borehole into the target formation.

FIG. 2B shows an example of a coring assembly 260 that includes a sidetrack tool 261 connected to a coring tool 262, which may be used to take a core at a coring angle 266 from the axial direction 267 of the borehole 250. For example, the coring angle 266 may range from greater than 0 degrees to less than 10 degrees, greater than 0 degrees to less than 5 degrees, or greater than 0 degrees to less than 2 degrees (e.g., 1.5 degrees). The coring assembly 260 may be used to take a core after drilling and logging operations have been completed from an additional hole cut at the coring angle 266 from the original borehole 250. Such technique may be referred to as selective coring after logging.

The coring tool 262 may include an elongated body 263 having a flexible portion 264 (e.g., made with a spring), which may allow some flexibility in the coring tool 262 as it is deviated to take the core at the coring angle 266. A core bit 265 may be connected at an axial end of the coring tool body 263, which may be rotated to drill into the borehole wall to take a core. The sidetrack tool 261 may include one or more arms that may extend outwardly from coring tool body 263 (e.g., from a point of connection between the flexible portion 264 of the coring tool body 263 and the core bit 265) to a side of the borehole 250 wall, which may hold the coring tool body 263 toward an opposite side of the borehole 250 wall as the core is drilled. Once drilled, the core may be taken to the surface of the well for analysis.

In the embodiment shown in FIG. 2B, the coring assembly 260 may not include a pressure vessel, and the core may be taken to the surface of the well without being pressurized. In other embodiments, a coring tool may include a pressure vessel to store a core in pressurized conditions, such as shown in FIG. 2A. Further, the coring assembly 260 shown in FIG. 2B may take one continuous core, while the coring tool 200 shown in FIG. 2A may take multiple cores.

Figure 3:
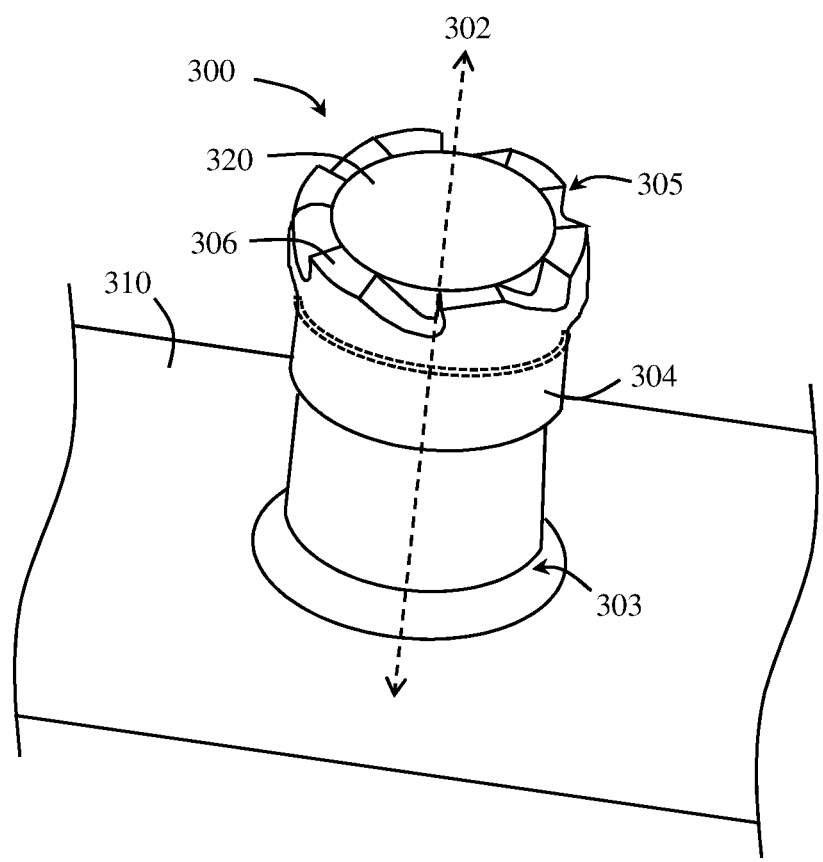
FIG. 3 shows a type of bit for a rotary sidewall coring tool according to embodiments of the present disclosure.

FIG. 3 shows an example of a bit 300 that may be extended from a coring tool 310 (e.g., such as shown in FIG. 2A) to take a plug 320 of a target formation zone. The bit 300 may be rotated about its longitudinal axis 302, which may be independent of the rotational axis of the coring tool 310 on which the bit 300 is mounted. The bit 300 may have a generally cylindrical body 304 that is rotationally mounted at a first axial end 303 of the cylindrical body 304 to the coring tool 310. At the opposite axial end, the cutting end 305 of the bit 300 may have a plurality of teeth 306 formed around the perimeter of the second axial end 305. A cavity may be formed within the inner diameter of the teeth 306, which may hold the plug 320.

Other coring tools known in the art may be used to collect plugs of a target formation zone from a wellbore after an agent has been impregnated a distance into the target formation zone and allowed to harden. Once the plug(s) are taken, they may be brought back to the surface of the well for analysis.

During the lab analysis, an initial CT scan of all material present in the pressure vessel may be conducted. A temperature and pressure program may be followed for the release of pressure of the pressure vessel to recover the plug(s) from the pressure vessel. CT scans may be re-run on the plug(s) after removal from the pressure vessel to verify that any cements captured on the CT scan pre-depressurization are still present in the plug material after the pressure has been released. Lab analysis may also include salt age determination, for example, using a technique called Strontium Isotope Residual Salt Analysis (SrRSA) that will determine the age of the salt.

Figure 4:
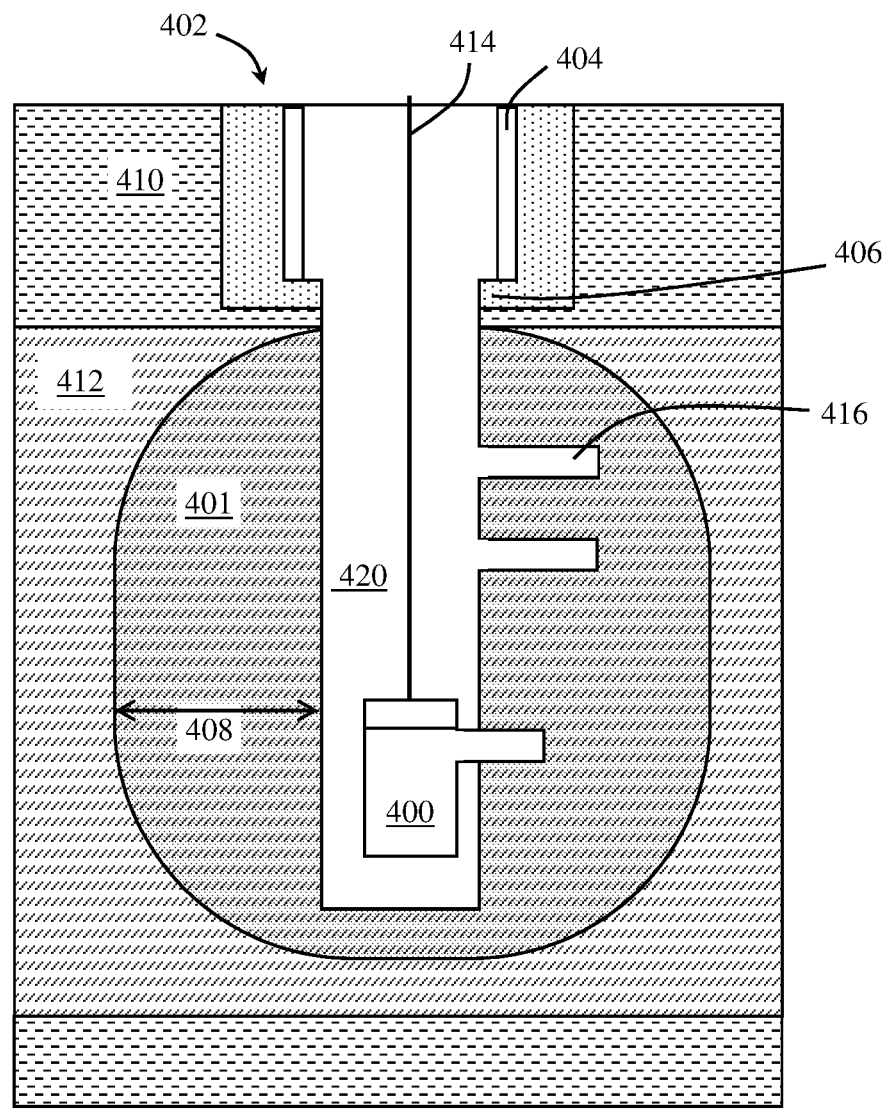
FIG. 4 shows a diagram of a coring system according to embodiments of the present disclosure.

FIG. 4 shows an example of a coring method using a coring tool 400 according to embodiments of the present disclosure. The method may include drilling a well 402, e.g., in overbalanced conditions, to above a target formation zone 412 in an upper formation 410. The well 402 may be cased 404, including a casing shoe 406 separating the cased portion of the well 402 from the target formation zone 412. The casing shoe 406 may be drilled through to drill a main wellbore 420 through the target formation zone 412. During underbalanced drilling, drilling fluid may be circulated through the wellbore 420 to provide a wellbore pressure that is less than formation fluid pressure within the target formation zone 412. In other embodiments, overbalanced conditions may be used, where drilling fluid may be circulated through the wellbore to provide a wellbore pressure greater than the formation fluid pressure but no greater than 200 psi over the formation fluid pressure. With the well closed in, an agent may be pumped into the wellbore 420 at a pressure greater than the formation fluid pressure to inject the agent a radial distance 408 into the target formation zone 412 from the wellbore 420, creating a penetrated region 401 of the target formation zone 412. The agent may be allowed to cure within the target formation zone 412.

A coring tool 400 may be sent downhole at the end of a wireline or drill string 414, where the coring tool 400 may take cores of the penetrated region 401 of the target formation zone 412. The coring tool 400 may have one (or more) bits that drill and retrieve cores (represented by the missing sections 416 from the penetrated region 401) from the target formation. The core bit(s) may extend outwardly from the coring tool 400 to drill within borehole 420 and take a plug from the penetrated region 401. The plug(s) may be stored in pressure vessels in the coring tool 400 and brought to the surface of the well 402 for analysis.

Figure 5:
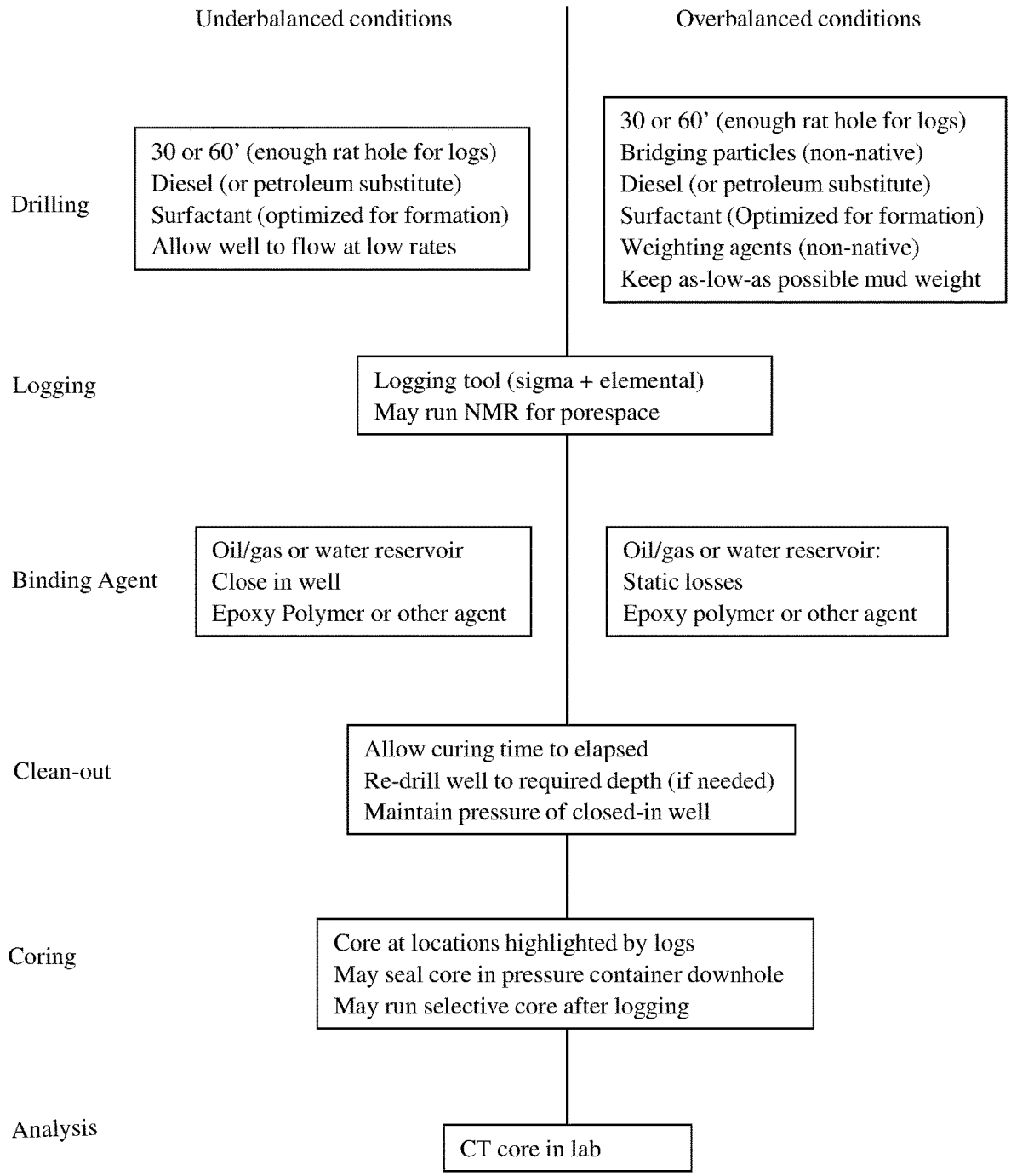
FIG. 5 shows a flow chart for methods according to embodiments of the present disclosure.

Referring now to FIG. 5, a flow chart of methods according to embodiments of the present disclosure is shown. For example, when drilling a well in underbalanced conditions, a wellbore may be drilled through a target formation zone with a minimum diameter of 8.5" and at a depth through the target formation zone that is deep enough to accommodate logging operations (e.g., at least 30 to 60 ft). Diesel or petroleum substitute based drilling fluid may be used to drill the wellbore, and may include surfactant(s) mainly for altering the near wellbore wettability to oil wet if countercurrent imbibition was to occur. After drilling the well and with the well shut-in, one or more logging passes may be conducted to gather sigma and elemental spectroscopy information of the target formation zone (or other wireline logs). The drill string may be lowered to above the target formation and an agent may then be pumped into the open hole to penetrate a distance into the target formation zone from the wellbore (e.g., a radial distance of about 2 to 4 ft from the wellbore). After the agent penetrates into the target formation zone and has cured, an optional cleaning step may be performed by either drilling out the cured agent or circulating fluid throughout the well. For example, in some embodiments, the wellbore may be re-drilled to a selected depth after hardening of the binding agent. In other embodiments, only the top part of the cemented well will be cleaned to allow for coring as described in FIG. 2B.

In some embodiments, the well may be shut-in to allow a curing time to lapse, such that the binding agent has time to harden within the penetrated region of the target formation zone. Further, the pressure may be maintained in the well while the binding agent is allowed to cure by shutting in the well.

Coring may occur after the agent has cured or hardened. In some embodiments, the locations along the borehole for collecting plugs may be selected based on logging information. The plugs may be stored in a pressure vessel in the coring tool and brought back to the surface of the well under the same or similar pressure conditions as the target formation zone from which they were collected.

Similarly, when drilling a well in overbalanced conditions, a wellbore may be drilled through a target formation zone a depth through the target formation zone that is deep enough to accommodate logging operations (e.g., at least 30 to 60 ft). Diesel or petroleum substitute based drilling fluid may be used to drill the wellbore, and may include surfactant(s) mainly for altering the near wellbore wettability to oil wet and/or for stabilizing the drilling fluid, weighting agents that are non-native to the target formation, and coarse bridging material that may allow sufficient access to target formation pore space during pumping of the agent, where the drilling fluid weight (and wellbore pressure) may be kept as low as possible. After drilling, one or more logging passes may be conducted to gather information from the target formation zone while monitoring the static losses that are being taken by the target formation. The drill string may be lowered to above the target formation and an agent may then be pumped into the openhole to penetrate a distance into the target formation zone from the wellbore (e.g., a radial distance of about 2 to 4 ft from the wellbore). After the agent penetrates into the target formation zone and has cured, an optional cleaning step may be performed by either drilling out the cured agent or circulating out the well. Coring may then take place after the agent has cured or hardened and the well displays no losses. The core material may be stored in a pressure vessel in the coring tool and brought back to the surface of the well under the same or similar pressure conditions as the target formation zone from which they were collected.

Advantageously, by impregnating an agent into the pore space of a rock formation according to embodiments of the present disclosure, soluble salt cements present in the rock formation may be preserved when coring the formation. Filling the pore space with an agent may also prevent drilling fluid or water from within the formation from precipitating the salt cements during coring, thereby providing more certainty that any salts found in the coring plugs/samples are native to the formation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   pumping an agent in a well across a target formation zone, the target formation zone comprising rocks containing soluble salt cement;
   using pressure to inject the agent into pore space within the target formation zone extending a radial distance from the well;
   allowing the agent to cure in the pore space; and
   taking a core of the target formation zone containing the cured agent.

2. The method of claim 1, wherein prior to pumping the agent, further comprising:
   selecting a drilling fluid that does not dissolve the salt cement; and
   drilling the well with the drilling fluid.

3. The method of claim 2, further comprising running a logging tool downhole after the well is drilled.

4. The method of claim 2, wherein the drilling fluid is circulated through the well to provide a wellbore pressure that is less than a formation fluid pressure within the target formation zone.

5. The method of claim 2, wherein the drilling fluid is circulated through the well to provide a wellbore pressure that is more than a formation fluid pressure within the target formation zone.

6. The method of claim 1, wherein prior to pumping the agent, further comprising:
   drilling an upper section borehole to above the target formation zone;
   setting casing around the upper section borehole, the casing comprising a casing shoe; and
   drilling through the casing shoe to drill a main borehole into the target formation zone.

7. The method of claim 6, wherein different drilling fluid conditions are used to drill the upper section and main boreholes, the drilling fluid conditions selected from at least one of drilling fluid pumping rate, drilling fluid composition, and wellbore pressure.

8. The method of claim 1, further comprising shutting in the well to allow the agent to cure.

9. The method of claim 8, wherein a coring tool is conveyed in the well and takes the core of the target formation zone while the well is shut in.

10. The method of claim 1, wherein taking the core of the target formation zone comprises:
    using a coring tool to drill a portion of rock from the target formation zone to take the core;
    loading the core into a pressure vessel in the coring tool; and
    maintaining a pressure on the core loaded in the pressure vessel as the coring tool is brought to a surface of the well.

11. The method of claim 1, wherein taking the core of the target formation zone comprises:
    using a selective coring after logging method to take a portion of rock from the target formation zone;
    guiding the core into a coring tool; and
    bringing the core to the surface of the well.

12. A method, comprising:
    drilling through a casing shoe to drill a main borehole into a target formation zone comprising rocks containing soluble salt cement;
    pumping an agent into the main borehole and to the target formation zone;
    using pressure to inject the agent into pore space within the target formation zone extending a radial distance from the main borehole;
    allowing the agent to cure in the pore space; and
    taking a core of the target formation zone containing the cured agent.

13. A method, comprising:
    pumping an agent in a well across a target formation zone comprising rocks containing soluble salt cement;
    using pressure to inject the agent into pore space within the target formation zone extending a radial distance from the well;
    allowing the agent to cure in the pore space; and
    taking a core of the target formation zone containing the cured agent while the well is shut in.

* * * * *